(12) United States Patent
Sugiyama

(10) Patent No.: US 8,046,762 B2
(45) Date of Patent: Oct. 25, 2011

(54) IMAGE PROCESSOR

(75) Inventor: Hiroki Sugiyama, Yamato-Koriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1283 days.

(21) Appl. No.: 11/707,921

(22) Filed: Feb. 20, 2007

(65) Prior Publication Data

US 2007/0240159 A1    Oct. 11, 2007

(30) Foreign Application Priority Data

Apr. 10, 2006    (JP) .................... 2006-107115

(51) Int. Cl.
G06F 9/46 (2006.01)
G06F 1/00 (2006.01)
G06F 1/26 (2006.01)
G06F 15/173 (2006.01)
G06F 3/12 (2006.01)

(52) U.S. Cl. ........ 718/102; 718/103; 718/104; 709/223; 709/224; 709/225; 709/226; 713/300; 713/320; 713/321; 358/1.15; 358/1.16

(58) Field of Classification Search .................... 718/102
See application file for complete search history.

(56) References Cited

U.S. PATENT DOCUMENTS

| | | | | |
|---|---|---|---|---|
| 6,389,248 B1* | 5/2002 | Konno et al. | ................... | 399/81 |
| 6,763,473 B1* | 7/2004 | Oteki et al. | ................... | 713/324 |
| 6,950,953 B2* | 9/2005 | Kizawa et al. | ................ | 713/324 |
| 7,272,737 B2* | 9/2007 | Oteki et al. | ................... | 713/324 |
| RE40,629 E * | 1/2009 | Konno et al. | ................... | 399/81 |
| 2002/0140974 A1* | 10/2002 | Imaizumi et al. | ............ | 358/1.15 |
| 2002/0149789 A1* | 10/2002 | Okazawa | ..................... | 358/1.14 |
| 2007/0046973 A1* | 3/2007 | Toda | ........................... | 358/1.13 |
| 2007/0300093 A1* | 12/2007 | Oteki et al. | ................... | 713/323 |

FOREIGN PATENT DOCUMENTS

| | | |
|---|---|---|
| JP | 10-262130 A | 9/1998 |
| JP | 2000-092254 A | 3/2000 |
| JP | 2000-307774 A | 11/2000 |
| JP | 2001-061027 A | 3/2001 |
| JP | 2002-27162 A | 1/2002 |
| JP | 2002-359703 A | 12/2002 |
| JP | 2005-088499 A | 4/2005 |
| JP | 2005-172869 A | 6/2005 |

* cited by examiner

Primary Examiner — Jennifer To
(74) Attorney, Agent, or Firm — Birch, Stewart, Kolasch & Birch, LLP

(57) ABSTRACT

An image processor keeps itself capable of executing a communication process with an external apparatus even in an energy-saving state, and offers a job reservation function while reducing power consumption as much as possible. The image processor has an energization switching circuit that makes switchover separately in energizing/deenergizing each of a plurality of function blocks, which execute a job, independent of energization of a Network Interface Card (NIC). The NIC has functions of counting the present time, obtaining a scheduled time and reserved job information on a reserved job to be executed at the scheduled time, identifying the reserved job to be started for execution on the basis of a counted time and the scheduled time included in the reserved job information, and starting up a function block needed for execution of the identified reserved job through control over the energization switching circuit.

12 Claims, 9 Drawing Sheets

FIG. 3

JOB RESERVATION INFORMATION

D11

| RESERVED JOB ID | TYPE OF JOB | SCHEDULED TIME |
|---|---|---|
| JOB01 | FX | xxxx |
| JOB02 | PR | xxxx |
| JOB03 | FT | xxxx |
| JOB04 | ML | xxxx | d1　　　　　d2　　　　　d3

JOB TYPE/SUBPOWER SUPPLY LINK TABLE

| JOB TYPE | FX | PR | FT | ML |
|---|---|---|---|---|
| FIRST SUBPOWER SUPPLY | ON | ON | ON | ON |
| SECOND SUBPOWER SUPPLY | — | — | — | — |
| THIRD SUBPOWER SUPPLY | — | ON | — | — |
| FOURTH SUBPOWER SUPPLY | ON | — | — | — |
| FIFTH SUBPOWER SUPPLY | — | — | — | — |

WEEKLY SCHEDULE

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | | | | | | | | | | ** | ** | ** | ** | ** | ** | ** | ** | ** | ** | | | | | |
| Tue | | | | | | | | | | ** | ** | ** | ** | ** | ** | ** | ** | ** | ** | ** | ** | ** | | |
| Wed | | | | | | | | | | ** | ** | ** | ** | ** | ** | ** | ** | ** | ** | ** | ** | ** | | |
| Thu | | | | | | | | | | ** | ** | ** | ** | ** | ** | ** | ** | ** | ** | ** | ** | ** | | |
| Fri | | | | | | | | | | ** | ** | ** | ** | ** | ** | ** | ** | ** | ** | | | | | |
| Sat | | | | | | | | | | ** | ** | ** | ** | | | | | | | | | | | |
| Sun | | | | | | | | | | | | | | | | | | | | | | | | |

IMAGE PROCESSOR

CROSS-NOTING PARAGRAPH

This Non-provisional application claims priority under 35 U.S.C. §119 (a) on Patent Application No. 2006-107115 filed in JAPAN on Apr. 10, 2006, the entire contents of which are hereby incorporated herein by reference.

FIELD OF THE INVENTION

The present invention relates to an image processor having a communication unit that communicates with an external apparatus.

BACKGROUND OF THE INVENTION

Generally, an image processor, such as a printer, scanner, fax machine, copier, and multifunctional peripheral (MFP) combining functions of those equipments, has a communication unit (NIC (Network Interface Card), modem (Modulator-Demodulator), etc.) that communicates with an external apparatus (computer, another image processor, etc.) via a communication medium such as a network and telephone circuit. Such an image processor may have a function of changing its operation state to a power-saving state (generally called sleep mode), where the processor consumes less power than power consumed in a regular operation state, when a given sleep condition is satisfied in the regular operation state.

The sleep condition, for example, includes a condition that an operation input unit incorporated into the image processor has received no operation input and the processor has received no data from an external apparatus through the communication unit for a given time or longer. The sleep condition may also include a condition that the present time is in a time zone that is set in a predetermined time schedule (e.g., weekly schedule).

For example, Japanese Laid-Open Patent Publication No. 2005-172869 discloses a digital MFP that has a weekly timer function of turning on and off the power supply for the MFP according to a predetermined weekly schedule. This function allows the image processor to automatically change its operation state into an energy-saving state in a time zone where a possibility of use of the image processor is extremely low, such as nighttime and holiday, and to automatically return to a regular operation state in other time zones. As a result, the image processor becomes capable of saving more power.

In another example, Japanese Laid-Open Patent Publication No. 2000-092254 discloses a fax machine that appoints a time and that transmits predesignated image data by fax when the appointed time has come. Hereinafter, such a function of appointing a scheduled time for executing a job (such as data transmission process) and executing the job at the scheduled time is called a job reservation function. An image processor having this job reservation function executes a job not particularly urgent in avoidance of a time of load concentration or executes such a job at a time of lower power cost, thus offers great convenience.

An image processor has a controlling unit that controls various devices of the processor. This controlling unit (usually a main controlling unit that assumes overall control over the entire part of the processor) controls energization of each device, thus controlling transfer to the energy-saving state and return to a regular state from the energy-saving state. The job reservation function is also realized by the controlling unit of the image processor.

The image processor so structured as to cause the controlling unit to realize the job reservation function, however, must keep the multifunctional controlling unit energized even in the energy-saving state, which poses a problem of difficulty in achieving a sufficient energy-saving effect.

Meanwhile, even when the image processor is in the energy-saving state, the communication unit (NIC, etc.) should desirably be kept energized so that the image processor at least sends back any form of reply in response to a given request, such as printing request, from an external apparatus. This is because of a necessity for preventing a user from having a wrong idea that the image processor is developing trouble.

SUMMARY OF THE INVENTION

The object of the present invention is to provide an image processor that keeps the processor capable of executing a communication process with an external apparatus even in an energy-saving state while reducing power consumption as much as possible and realizing the job reservation function.

The present invention is an image processor having such a communication unit as NIC that communicates with external apparatuses. The image processor includes the following constituents (1) to (5), among which the constituents (2) to (5) are combined by the communication unit.

(1) An energization switching unit that makes switchover separately in energizing/deenergizing each of a plurality of function blocks, which is a component or an assembly of components executing a given job, independent of energization of the communication unit.

(2) A time counting unit that counts the present time.

(3) A reservation information obtaining unit that obtains a given scheduled time and reserved job information on a reserved job to be executed at the scheduled time from a given memory unit.

(4) An execution start job identifying unit that identifies the reserved job to be started for execution on the basis of a counted time given by the time counting unit and the scheduled time obtained by the reserved information obtaining unit.

(5) An automatic startup controlling unit that when a function block needed for execution of the reserved job identified by the execution start job identifying unit is in a deenergized state, changes the state of the function block into an energized state through control over the energization switching unit.

The image processor having the above configuration is capable of energization control over a function block needed for execution of a job, independent of energization of the communication unit. As a result, the image processor can keep the processor capable of executing a communication process with an external apparatus even in the energy-saving state, where the function block is not energized. In addition, according to the image processor the communication unit, which is kept energized even when the image processor is in the energy-saving state, offers a function of time management for the job reservation function, and of controlling the startup of a function block needed for execution of a reserved job. Because of this, the image processor can realize the job reservation function while reducing power consumption as much as possible in the energy-saving state.

The reservation information obtaining unit may be provided as a unit that obtains information from a memory unit of an external apparatus, which can communicate with the communication unit, or as a unit that obtains information from a memory unit of the image processor.

For example, the image processor according to the present invention further includes a job reservation information memory unit that stores job reservation information linking the scheduled time to the reserved job information, and allows the reserved information obtaining unit to obtain the scheduled time and reserved job information from the job reservation information memory unit.

In this case, the communication unit is further provided with a job reservation information external access unit that executes one or a plurality of processes on the job reservation information stored in the job reservation information memory unit, the processes being executed out of processes of transmission to an external apparatus, contents updating, and information deletion, in response to a request from the external apparatus.

This eliminates a need for the image processor to bother to start up a function block for reference to or updating of the job reservation information when the processor is in the energy-saving state, thus suppresses an increase in power consumption.

The execution start job identifying unit identifies a plurality of the reserved jobs corresponding to a plurality of the scheduled times as scheduled jobs to be started for execution when the plurality of the scheduled times included in a given time range are present for a counted time given by the time counting unit.

Generally, electric or electronic components composing the function block consume a great amount of power at the start of energization. To reduce power consumption, therefore, a shorter energization time and a fewer frequency of startup is desirable for the function block. According to the image processor having the above configuration, when scheduled times corresponding to a plurality of the reserved jobs are set in a relatively short time range, the plurality of the reserved jobs are executed at once as the function block is started up only once. As a result, the frequency of startup of the function block is reduced to enable further energy-saving.

When the state of a plurality of function blocks is changed into the energized state, the automatic start controlling unit should preferably change the state of the function blocks into the energized state in sequence from a function block requiring a longer startup time according to a predetermined procedure.

In this case, further preferably, the automatic start controlling unit should change the state of each of the plurality of the function blocks into the energized state according to the predetermined procedure so that the function blocks become completely ready for operation exactly or almost at the same time.

This reduces wasted power in a waiting time from a point that a function block requiring a shorter startup time becomes completely ready for operation to a point that other function blocks become completely ready for operation.

The controlling unit (main controlling unit) carrying out overall control over the image processor usually has a clock IC with a battery-fed power backup. In contrast, the communication unit, typically an NIC, does not usually have such a high-performance IC, but has a clock oscillator that generates clock signals at a constant cycle.

For preferable application, therefore, when the function block is provided with a reference time counting unit (equivalent to the clock IC) that counts a reference time for the image processor with backup power from a battery, the time counting unit combined by the communication unit should have the following constituents (1) to (3).

(1) A clock signal generating unit (equivalent to the clock oscillator) that generates clock signals at a constant cycle.

(2) A clock summation time counting unit that counts the present time on the basis of a result of summation of the clock signals.

(3) A time correcting unit that obtains a counted time given by the reference time counting unit to correct a counted time given by the clock summation time counting unit when the function block having the reference time counting unit is in the energized state.

These constituents enable realization of a schedule startup controlling unit without providing the communication unit anew with such a high-performance component as clock IC.

However, the clock signal generating unit (clock oscillator) incorporated into the communication unit shows a signal cycle of lower precision in many cases. Because of this, a long period of no correction of a counted time based on the clock signal generating unit could lead to the imprecision of the schedule startup controlling unit.

For preferable application, therefore, when the function block having the reference time counting unit is in the deenergized state, the time correcting unit should change the state of the function block into the energized state through control over the energization switching unit and obtain a counted time given by the reference time counting unit of the function block to correct a counted time given by the clock summation time counting unit.

BRIEF DESCRIPTION OF THE DRAWINGS

FIG. 3 depicts an example of the data structure of job reservation information referred by the NIC of the image processor X;

FIG. 4 depicts an example of the data structure of a job type/subpower supply link table referred by the NIC of the image processor X;

PREFERRED EMBODIMENTS OF THE INVENTION

Embodiments of the present invention will now be described with reference to the accompanying drawings for better understanding of the present invention. The following embodiments present specific examples of the present invention, and are not intended to limit the technical scope of the present invention.

Figure 1:
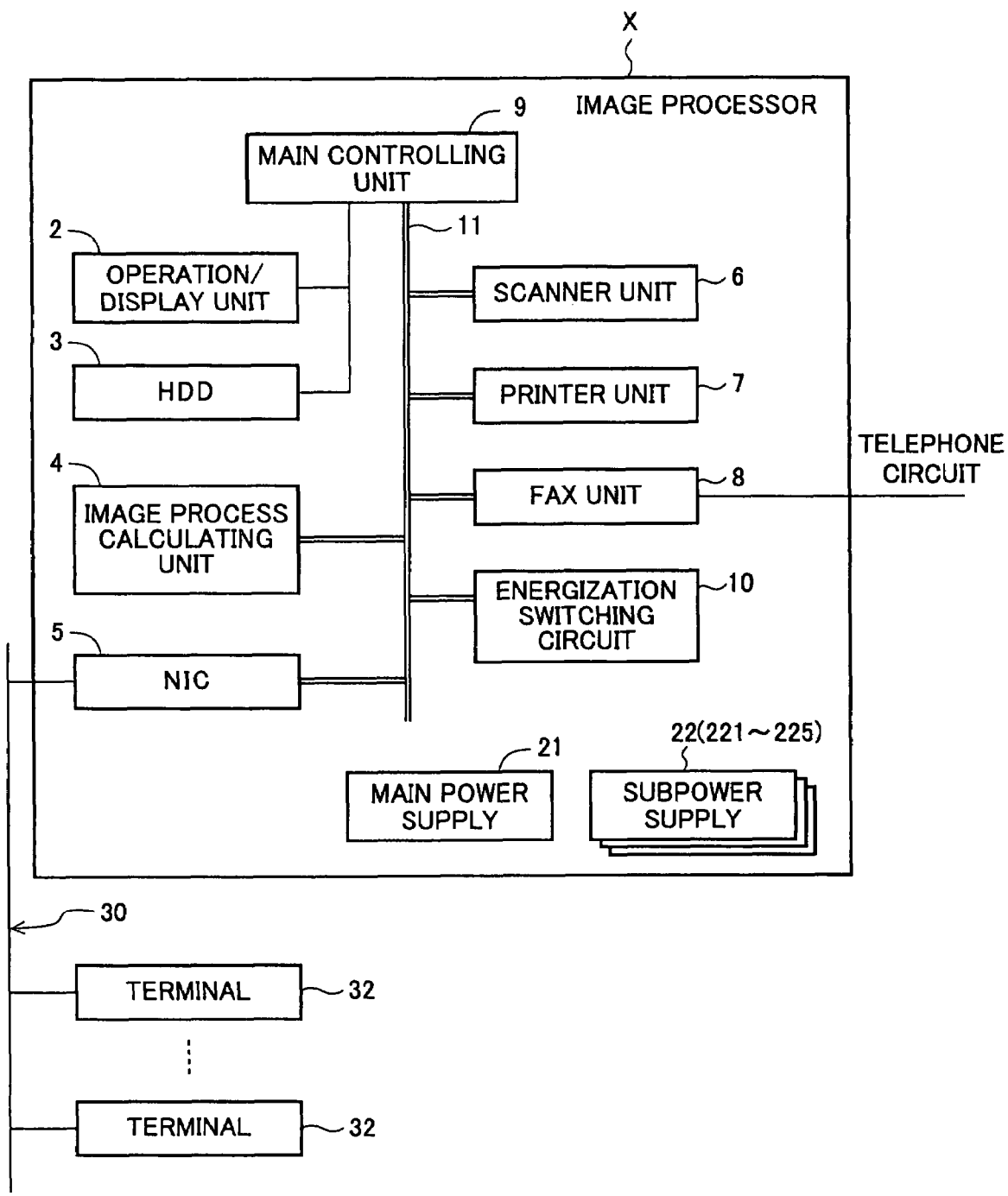
FIG. 1 is a block diagram of the outline structure of an image processor X according to an embodiment of the present invention.

FIG. 1 is a block diagram of the outline structure of an image processor X according to an embodiment of the present invention. The image processor X according to the embodiment of the present invention will first be described referring to the block diagram shown in FIG. 1.

The image processor X has an NIC 5 that communicates with an external apparatus through a network composed of a LAN, WAN, etc. Through this NIC 5, the image processor X communicates with an external apparatus, such as a terminal 32 that sends such a given job as print process to the image processor X, and an e-mail server (not shown) to which the image processor X makes access upon sending or receiving an e-mail.

The image processor X has a job reservation function of executing a reserved job of fax/e-mail transmission, etc., at a scheduled time or a time close to the scheduled time for executing the reserved job when the reserved job and the scheduled time are set.

<Image Processor X>

The image processor X is capable of communicating with an external apparatus (terminal 32, e-mail server not shown, etc.), for example, via a network 30 composed of a LAN, Internet, etc., and has the network interface card 5 (hereinafter "NIC"), which is an instance of a communication unit carrying out the communication with the external apparatus. The terminal 32 is a computer, such as personal computer.

In addition to the NIC 5, as shown in FIG. 1, the image processor X includes an operation/display unit 2, a hard disc drive 3 (hereinafter "HDD"), an image process calculating unit 4, a scanner unit 6, a printer unit 7, a fax unit 8, a main controlling unit 9, an energization switching circuit 10, a main power supply 21, and a subpower supply 22.

In the example shown in FIG. 1, the main controlling unit 9, the image process calculating unit 4, the NIC 5, the scanner unit 6, the printer unit 7, the fax unit 8, and the energization switching circuit 10 are interconnected through a bus 11.

Each of the operation/display unit 2, scanner unit 6, printer unit 7, fax unit 8, and main controlling unit 9 is a function block structured as a component or an assembly of components that is divided according to each function.

The operation/display unit 2 has an operation input unit for inputting information, and a display unit for displaying the information. The operation input unit is composed of, for example, sheet keys, a touch panel formed on the surface of a liquid crystal display device, etc. The display unit is composed of, for example, a liquid crystal display device, an LED lamp, etc. The operation/display unit 2 constitutes a man-machine interface for a user.

The HDD 3 is a large-capacity nonvolatile memory that stores processed data according to a need when image data read from a document is processed or when image data is printed out. The HDD 3 is also used to save e-mail data obtained from an e-mail server, which is not shown.

The image process calculating unit 4 is composed of a dedicated signal process circuit or a DSP (Digital Signal Processor), etc., and executes various image processes on image data, including generation of print data used for image formation (image data, print job, etc.), generation of image data to be sent to the terminal 32 (e.g., image data encoded in such a prescribed format as JPEG format), encrypting of image data, decrypting of encoded image data, compression/encoding of image data, and decompression (restoration) of compressed/coded image data.

The scanner unit 6 is an assembly of components including a device that reads an image formed on a document that is placed on a glass document platen, which is not shown, or is transferred from an ADF (Automatic Document Feeder), which is not shown, and a MPU (Micro-Processing Unit) that controls the device.

In addition to the ADF, the scanner unit 6 is also provided with, for example, a light source that emits light onto the image surface of a document, and with a mirror that reflects reflected light from the document in a given direction. The scanner unit 6 further includes a movable optical unit that is structured to be movable along the document, a motor that drives the movable optical unit, a stationary mirror that guides light emitted out of the movable optical unit along a given path, a lens that condenses guided light, and a CCD (Charge Coupled Device) that converts light having passed through the lens into electricity to put out an electric signal as strong as the quantity of light (i.e., light reflected at the image surface of the document). The electric signal put out of the CCD is transferred as image data to the image process calculating unit 4.

The printer unit 7 is an assembly of components including a unit that sequentially sends out recording paper sheets stored in a paper feeding cassette, which is not shown, one by one to transfer the recording paper sheets to a paper ejecting tray via a given image formation position, a unit that forms (puts out) an image on the recording paper sheet at the image formation position on the basis of document image data read by the scanner unit 6 from a document or of printing image data generated by the image process calculating unit 4, and an MPU that controls the units.

The image processor X functions as a copier as the processor X carries out an image forming process based on a document image data, and functions as a printer as the processor X carries out an image forming process based on a print request (print job) receiving from the terminal 32.

The printer unit 7, for example, includes a photosensitive drum that carries an image, an electrifier that electrifies the photosensitive drum, an exposure device that writes a static latent image on the surface of the photosensitive drum, the latent image being based on given image data or print job, a developer that develops the static latent image into a toner image, a transferor that transfers the toner image on the photosensitive drum to a recording paper sheet, and a motor that drives the photosensitive drum and paper transfer rollers.

The fax unit 8 is composed of an NCU (Network Control Unit), modem, etc. The fax unit 8 carries out dial-up connection or a negotiation process for determining a method of communication with a communicating party (communicating station), transmitting/receiving fax data to/from another fax machine through the telephone circuit.

The NIC 5 is a communication interface (instance of a communication unit) that transmits or receives data to or from an external apparatus, such as an e-mail server (not shown), through the network 30, which is composed of, for example, a LAN conforming to the IEEE standard 802.3, the Internet, etc.

The main power supply 21 and the subpower supply 22 are power circuits, supplying power to each of the constituents of the image processor X.

The energization switching circuit 10 is the switching circuit (instance of an energization switching unit) that makes switchover in connecting/disconnecting the subpower supply 22 to/from a commercial power supply according to a control signal received from the NIC 5, thus making switchover in separately energizing/deenergizing each function block of the main controlling unit 9, the scanner unit 6, the printer unit 7, the fax unit 8, etc. The energization switching circuit 10 is capable of making switchover in separately energizing/deenergizing each of the main controlling unit 9, scanner unit 6, printer unit 7, and fax unit 8, independent of energization of the NIC 5.

The main controlling unit 9 controls the operation/display unit 2, the HDD 3, and the image process calculating unit 4. The main controlling unit 9 sends/receives information needed for data processing executed by the MPU built in the scanner unit 6, printer unit 7, and fax unit 8, and information obtained by the data processing.

For example, the main controlling unit 9 delivers information of the size of a recording paper sheet on which an image is to be formed, of a magnification/demagnification rate and a thickness correction value for an output image, and of selective execution of a color image forming process or a monochromic image forming process, to the MPU built in the printer unit 7, and obtains information of the number of recording paper sheets finished with image formation and of an error occurring on the printer unit 7, from the MPU of the printer unit 7. The main controlling unit 9 delivers information of image data to be sent out and of the telephone number of a destination, to the MPU built in the fax unit 8, and obtains information of an error occurring during fax transmission, from the MPU of the fax unit 8.

The main controlling unit 9 delivers information of an image reading range on a document, to the MPU built in the scanner unit 6, and obtains information of the number of sheets of the document finished with image reading under operation by the ADF, of image data read by the scanner unit 6, and of an error occurring on the ADF, from the MPU of the scanner unit 6.

In addition, the main controlling unit 9 has an e-mail sending/receiving function of executing a process of requesting an e-mail server (not shown), which is capable of communicating via the network 30, to send out e-mail data addressed to the image processor, the e-mail data being stored in the memory unit of the server, to obtain the e-mail data, and a process of sending e-mail data with the e-mail address of a destination to the e-mail server, both processes being executed through the NIC 5.

Figure 2:
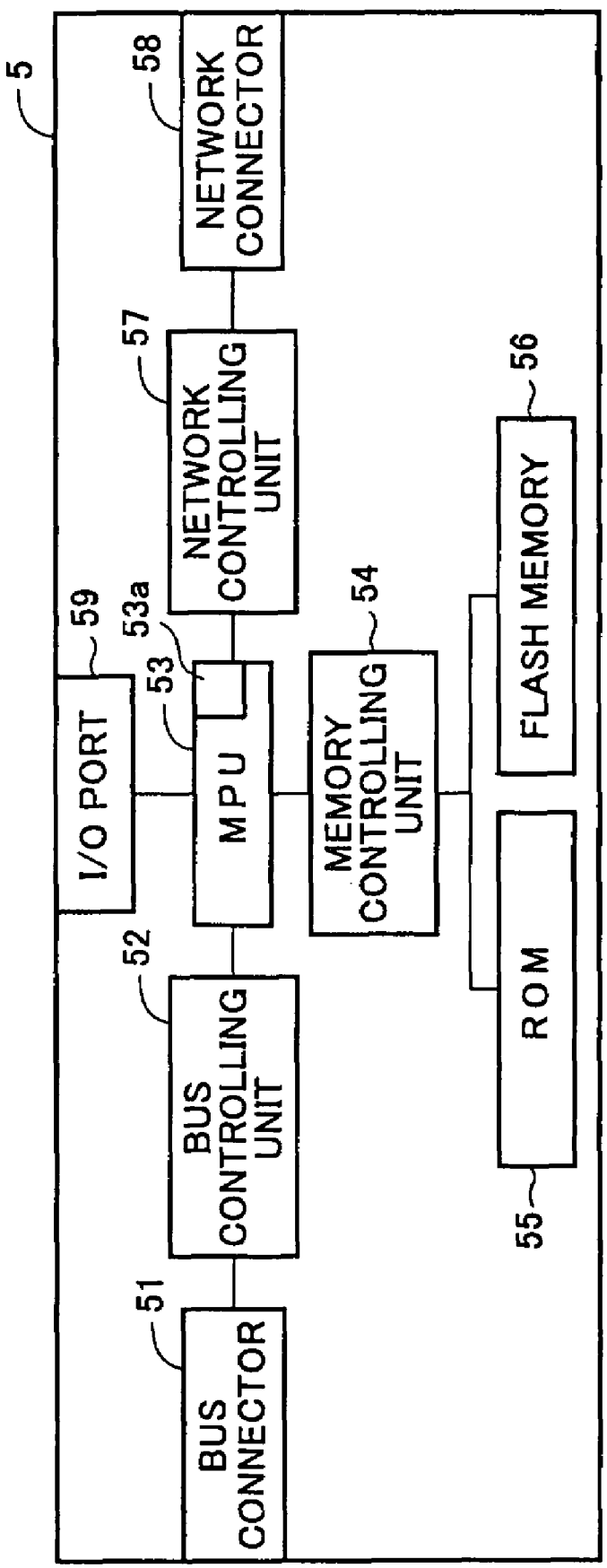
FIG. 2 is a block diagram of the outline structure of an NIC incorporated in the image processor X.

FIG. 2 is a block diagram of the outline structure of the NIC incorporated in the image processor X. The NIC 5 incorporated in the image processor X will be described referring to the block diagram shown in FIG. 2.

The NIC includes a bus connector 51, a bus controlling unit 52, an MPU 53, a memory controlling unit 54, a ROM 55, a flash memory 56, a network controlling unit 57, and a network connector 58.

The bus connector 51 is the connector connected to the bus 11, and the bus controlling unit 52 carries out signal transmission to other devices through the bus 11.

The network connector 58 is the connector physically connected to the network 30, and the network controlling unit 57 carries out communication control conforming to a given network protocol of, for example, IEEE standard 802.3, TCP/IP, etc.

The MPU 53 is the calculating unit that executes a program stored beforehand in the ROM 55 to carry out various processes including relaying signal transmission between the bus 11 and the network 30 and responding to a request for a given process from the terminal 32 via the network 30. The program to be executed is deployed in a RAM (not shown) built in the MPU 53 and is executed. The MPU 53 makes access to the ROM 55 or to the flash memory 56 via the memory controlling unit 54.

The ROM 55 of the NIC 5 stores programs to be executed by the MPU 53 and data to be referred by the MPU 53.

The flash memory 56 of the NIC 5 stores data which is stored and referred by the MPU 53 in the course of execution of a process.

The MPU 53 of the NIC 5 has a clock oscillator 53a that generates oscillation signals at a given cycle. The MPU 53 of the NIC 5 obtains the present time from the main controlling unit 9 at given timing. Hereinafter, this obtained time is called time counting start time. The MPU 53 of the NIC 5 sums up oscillation signals from the clock oscillator 53a to count a passed time from the point of obtainment of the time counting start time from the main controlling unit 9, and counts the present date and time (present time) on the basis of the passed time and the time counting start time.

The present time counted by the MPU 53 of the NIC 5 is reset when the NIC 5 becomes the deenergized state. When the main controlling unit 9 is in "energized state", therefore, the MPU 53 of the NIC 5 obtains the time at the present point (including year/month/day, day of the week, and time) from a calendar administrating unit 99 of the main controlling unit 9 shown in FIG. 5, and carries out a time correcting process based on the obtained time.

According to the time correcting process, for example, when the main controlling unit 9 is in "energized state", the MPU 53 of the NIC 5 obtains the time at the present point from the calendar administrating unit 99 of the main controlling unit 9 on a regular basis, and takes the obtained time to be the time counting start time to resume time counting based on clock signals from the clock oscillator 53a. Through this process, a time counted by the NIC 5 is corrected by a counted time given by the calendar administrating unit 99. Following the time correction, the MPU 53 of the NIC 5 keeps counting the time after correction.

The MPU 53 of the NIC 5 also has a reserved job time administrating function in the job reservation function described above.

FIG. 3 depicts an example of the data structure of job reservation information D11 stored beforehand in the flash memory 56 of the NIC 5.

As shown in FIG. 3, the job reservation information D11 is the information that links together a scheduled time d3, a reserved job ID (d1) identifying a reserved job to be executed at the scheduled time d3, and the type d2 of the reserved job (each of the time d3, job ID d1, and type d2 is an instance of reserved job information). The MPU 53 of the NIC 5 recognizes the type and scheduled execution time of a reserved job reserved for execution on the basis of the job reservation information D11 stored in the flash memory 56 (instance of a job reservation information memory unit) of the NIC 5.

The set contents of the job type d2 shown in FIG. 3 includes "FX" representing a fax transmission job, "PR" representing a print job, "FT" representing a job of transmitting a data file to the terminal 32 in a LAN, etc. (hereinafter "file transmission job"), and "ML" representing an e-mail data transmission job.

The scheduled time d3 has set contents of, for example, information representing time itself (hour/minute), and information representing the sum (count) of oscillation signals from the clock oscillator 53a counted according to the start point of the time counting start time.

The main controlling unit 9, which will be explained later, has a job reservation setting function of allowing a user to set the contents of the job reservation information D11 through control over the operation/display unit 2. The job reservation information D11 set through the job reservation setting function is stored in the HDD 3, and is transmitted from the main controlling unit 9 to the NIC 5, where the MPU 53 stores the job reservation information D11 in the flash memory 56. The actual contents of a reserved job (data itself of the reserved job) is linked to the job reservation information D11 and stored in the HDD 3 by the main controlling unit 9, but is not transmitted to the NIC 5.

How a reserved job is processed in the image processor X will be explained later.

FIG. 4 depicts an example of the data structure of a job type/subpower supply link table referred by the NIC of the image processor X. The job type/subpower supply link table D12 referred by the NIC 5 of the image processor X will be described referring to the data structure diagram shown in FIG. 4.

The job type/subpower supply link table D12 is the information that indicates for each type of job subpower supplies needed to be turned on to execute the job.

Figure 6:
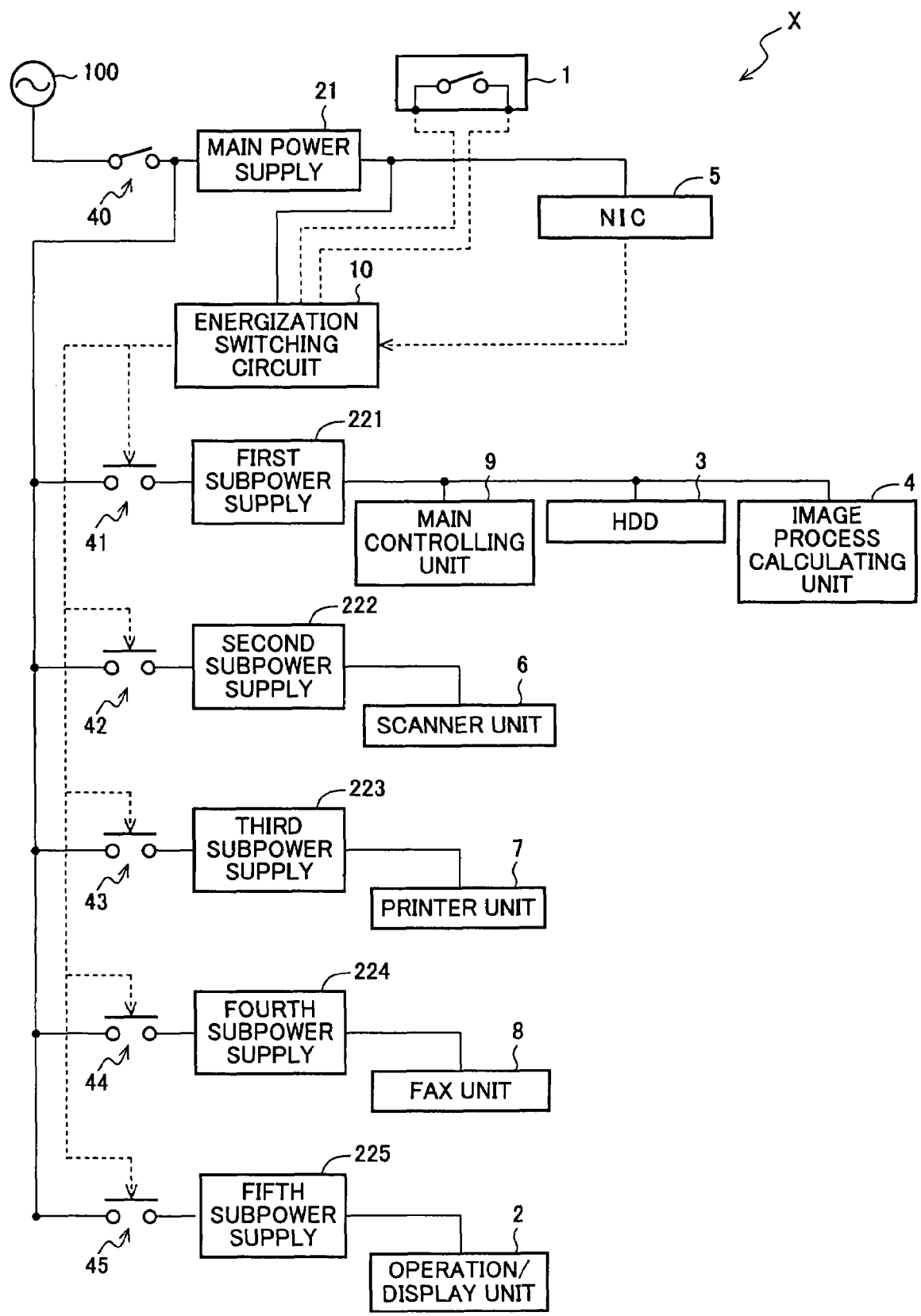
FIG. 6 is a power system diagram of a power connection relation in the image processor X.

The job type/subpower supply link table D12 shown in FIG. 4 thus informs that a first subpower supply 221 and a second subpower supply 224 shown in FIG. 6 need to be turned on to execute the fax transmission job (denoted by "FX" in FIG. 4), that the first subpower supply 221 and a third subpower supply 223 need to be turned on to execute the print job (denoted by "PR" in FIG. 4), and that the first subpower supply 221 needs to be turned on to execute the file transmission job (denoted by "FT" in FIG. 4) or e-mail data transmission job (denoted by "ML" in FIG. 4).

The job type/subpower supply link table D12, therefore, informs that the main controlling unit 9, HDD 3, image process calculating unit 4, and fax unit 8 are necessary but the scanner unit 6, printer unit 7, and operation/display unit 2 are unnecessary for execution of the fax transmission job, that the main controlling unit 9, HDD 3, image process calculating unit 4, and print unit 7 are necessary but the scanner unit 6, fax unit 8, and operation/display unit 2 are unnecessary for execution of the print job, and that the main controlling unit 9, HDD 3, and image process calculating unit 4 are necessary but the scanner unit 6, printer unit 7, fax unit 8, and operation/display unit 2 are unnecessary for execution of the file transmission job and e-mail data transmission job.

The job type/subpower supply link table D12 is, for example, stored beforehand in the flash memory 56 of the NIC 5, or may be stored in a memory unit of an external apparatus to which the image processor X is accessible through the NIC 5.

Figure 5:
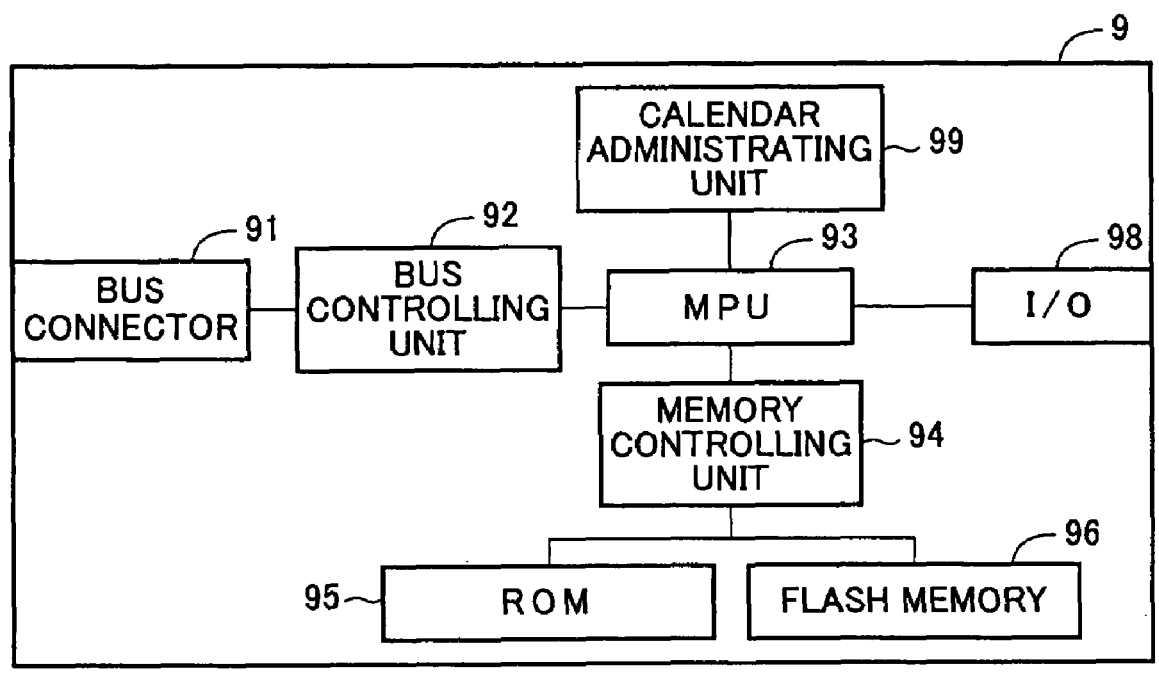
FIG. 5 is a block diagram of the outline structure of a main controlling unit incorporated in the image processor X.

FIG. 5 is a block diagram of the outline structure of the main controlling unit incorporated in the image processor X. The structure of the main controlling unit 9 incorporated in the image processor X will be described referring to the block diagram shown in FIG. 5.

The main controlling unit 9 includes a bus connector 91, a bus controlling unit 92, an MPU 93, a memory controlling unit 94, a ROM 95, a flash memory 96, an I/O port 98, and a calendar administrating unit 99.

Each of the bus connector 91, bus controlling unit 92, memory controlling unit 94, ROM 95, and flash memory 96 has the same function as each of the bus connector 51, bus controlling unit 52, memory controlling unit 54, ROM 55, and flash memory 56, which are incorporated into the NIC 5. Naturally, the contents of programs and data stored in the ROM 95 and flash memory 96 are different from those stored in the ROM 55 and flash memory 56 of the NIC 5.

The main controlling unit 9 controls devices involved in various image processes by causing the MPU 93 to execute programs stored in the ROM 95 and flash memory 96.

The I/O port 98 of the main controlling unit 9 is connected to a signal line that transmits an output control signal to a device, which is to be a controlled object of the main controlling unit 9, and to a signal line that transmits various input detected signals from various sensors to the main controlling unit 9. The I/O port 98 thus serves as an interface relaying between the signal lines and the MPU 93.

For example, the I/O port 98 of the main controlling unit 9 is connected to devices composing the operation/display unit 2 and the HDD 3, and to signal lines leading to various sensors.

The main controlling unit 9 is provided with the calendar administrating unit 99, which has a time counting circuit that counts time. The calendar administrating unit 99 detects the present year, month, day, day of the week, and time on the basis of a time counted by the time counting circuit. The calendar administrating unit 99 is supplied with power from a battery charged with power supplied from the first subpower supply 221. The calendar administrating unit 99 continues its operation with power supplied from the battery even when power supply from the first subpower supply 221 is cut off.

In FIGS. 2 and 5, the flash memories 56, 96 are depicted as nonvolatile memory unit to which the MPUs 53, 93 can write data and from which the MPUs 53, 93 can read out data. These flash memories 56, 96 may be replaced with other nonvolatile memory units, such as EEPROM (Electrically Erasable Programmable Read-Only Memory).

FIG. 6 is a power system diagram of a power connection relation in the image processor X. An example of a power connection relation to each function block in the image processor X will be described referring to the power system diagram shown in FIG. 6.

In FIG. 6, power supply lines are represented by continuous lines, and signal transmission lines other than the power supply lines are represented by broken lines.

According to the example shown in FIG. 6, the image processor X has five subpower supplies 22, which are hereinafter called the first subpower supply 221 to fifth subpower supply 225.

The main power supply 21 is the power supply that supplies power to the NIC 5 and to the energization switching circuit 10.

The main power supply 21 is connected to a commercial power supply 100, which is the primary power source to the whole of the image processor X, via a manual changeover switch 40, with which changeover is made in connection/disconnection to/from the power supply lines by manual operation. A user carries out changeover operation on the changeover switch 40 to make changeover in energizing/deenergizing the NIC 5 and the energization switching circuit 10. The NIC 5 and energization switching circuit 10 are, therefore, kept in the energized state when the image processor X is connected to the commercial power supply 100 unless the user operates the manual changeover switch 40 to bring it into a disconnected state from a connected state. Once the manual changeover switch 40 is brought into the disconnected state, the whole of the image processor X is brought into the deenergized state (suspended state).

The first subpower supply 221 is the power supply circuit that supplies power to the main controlling unit 9, to the HDD 3, and to the image process calculating unit 4.

The second subpower supply 222, the third subpower supply 223, the fourth subpower supply 224, and a fifth subpower supply 225 are power supply circuits that supply power to the scanner unit 6, to the printer unit 7, to the fax unit 8, and to the operation/display unit 2, respectively.

Each first subpower supply 221 to fifth subpower supply 225 is connected to the commercial power supply 100 via the manual changeover switch 40 and each automatic changeover switch 41 to 45, which makes changeover in connection/disconnection to/from the power supply line on the basis of a given control signal. As shown clearly in FIG. 6, a corresponding relation is established between the automatic changeover switch 41 and the first subpower supply 221, the automatic changeover switch 42 and the second subpower supply 222, the automatic changeover switch 43 and the third subpower supply 223, the automatic changeover switch 44 and the fourth subpower supply 224, and the automatic changeover switch 45 and the fifth subpower supply 225.

As a result, when the manual changeover switch 40 has been in the connected state and each automatic changeover switch 41 to 45 is brought into the connected state, each subpower supply 221 to 225 is brought into the energized state.

Hereinafter, connection and disconnection of a power supply line is called turning on and turning off of the power supply line. Likewise, a connected state and disconnected state of a power supply line is called a turned-on state and turned-off state of the power supply line.

The automatic changeover switches 41 to 45 function as the energization switching unit that make switchover in separately energizing/deenergizing each function block 9, 6, 7, 8, 2 as each changeover switch 41 to 45 is turned on or off.

Hereinafter, when the NIC 5 is in the energized state (manual changeover switch 40 is in the connected state) and one or more of the function blocks 2, 6 to 9 are in the deenergized state (one or more of the automatic changeover switches 41 to 45 are in the turned-off state), an operation mode of the image processor X is called a sleep mode. When the NIC 5 and function blocks 2, 6 to 9 are in the energized state, an operation mode of the image processor X is called an operating mode.

As shown in FIG. 6, the NIC 5 controls turning on and off of every automatic changeover switch 41 to 45 through the energization switching circuit 10, thus separately controls energization of each function block. Namely, the NIC, serves also as a device for executing energization control over each function block.

The image processor X has an operation detecting switch 1 that is switched between the turned-on state and turned-off state by operation of the user. The turned-on state and turned-off state of the operation detecting switch 1 is detected by the energization switching circuit 10.

The operation detecting switch 1 functions as an energization switch that makes switchover in bringing the image processor X into either operating mode or sleep mode.

Specifically, when the operation detecting switch 1 is switched to the turned-on sate in the sleep mode, the energization switching circuit 10 turns on every automatic changeover switch 41 to 45 to bring the image processor X into the operating mode.

When the operation detecting switch 1 is switched to the turned-off state in the operating mode, the energization switching circuit 10 turns off every automatic changeover switch 41 to 45 to bring the image processor X into the sleep mode unless any kind of job is being processed.

According to the image processor X, when each function block is energized, the MPU 53 of the NIC 5 determines on whether the following two conditions (hereinafter "first sleep condition", "second sleep condition") are met. When either of the sleep conditions is met, the NIC 5 controls the energization switching circuit 10, changing the mode of the image processor X into the sleep mode, where power supply to one or more of the function blocks is cut off. In the sleep mode, one or more of five automatic changeover switches 41 to 45 are brought into "turned-off state" in changeover, which puts one or more of the function blocks into "deenergized state." When every automatic changeover switch 41 to 45 is brought into "turned-off state", therefore, a very few devices including the NIC 5 (NIC 5 and the energization switching circuit 10) remain in "energized state" in the image processor X.

The MPU 53 of the NIC 5 records sleep mode transfer reason information in the flash memory 56 of the NIC 5 when operation mode transfer to the sleep mode is carried out. The transfer reason information states which one of the first sleep condition and second sleep condition has been met.

<First Sleep Condition>

The first sleep condition is the condition that the present date and time fall onto a time zone set to the sleep mode in a preset weekly time schedule (hereinafter "weekly schedule"). Hereinafter, control of a state of energization of each function block through control over the automatic changeover switches 41 to 45 according to the preset weekly schedule (instance of a time schedule) is called weekly timer control. The MPU 53 of the NIC 5 executing the weekly timer control is an instance of a schedule controlling unit.

Figure 7:
FIG. 7 is a diagrammatic view of a weekly schedule for weekly timer control in the image processor X.

FIG. 7 is a diagrammatic view of the contents of a weekly schedule WS for weekly timer control in the image processor X. In FIG. 7, each square represents a time zone that is fixed by the day of the week (Monday to Sunday) and time (00 to 23). A blank square represents a time zone set to the sleep mode, and a square marked with "*" represents a time zone set to the operating mode, where each function block is energized. The weekly schedule WS is the information that is preset for each of the first subpower supply 221 to fifth subpower supply 225.

The MPU 53 of the NIC 5 obtains information of the weekly schedule WS for each of the first subpower supply 221 to fifth subpower supply 225 in advance from the main controlling unit 9, and puts the weekly schedule WS information into the flash memory 56 in advance for storage.

The MPU 53 of the NIC 5 determines on which one of the sleep mode time zone and the operating mode time zone that the present time counted by the clock oscillator 53*a* falls onto in the weekly schedule WS stored in the flash memory 56. According to a result of the determination, the MPU 53 of the NIC 5 controls the automatic changeover switches 41 to 45 through the energization switching circuit 10 to separately change the state of each function block 2, 6 to 9 from "energized state" to "deenergized state" (transfer to the sleep mode), or from "deenergized state" to "energized state" (transfer to the operating mode).

The main controlling unit 9 has a weekly schedule setting function of allowing a user to set the contents of the weekly schedule WS through control over the operation/display unit 2. The weekly schedule WS set through the weekly schedule setting function is transmitted from the main controlling unit 9 to the NIC 5, where the MPU 53 stores the weekly schedule WS in the flash memory 56.

The MPU 53 of the NIC 5 may also be provided with a function of transmitting the weekly schedule WS stored in the flash memory 56 to the external terminal 32 in response to a request from the terminal 32 through the network 30, or with a function of updating the contents of the weekly schedule WS.

<Second Sleep Condition>

The second sleep condition is the condition that when the first condition is not met, any operation input through the operation/display unit 2 and any data process request (print job, etc.) from an external apparatus through the network 30 have not been received for a given time or longer.

For example, when the NIC 5 determines on whether the second sleep condition is met, the MPU 53 of the NIC 5 detects the presence/absence of operation input to the operation/display unit 2 via the main controlling unit 9 and the bus 11, and also detects the presence/absence of data reception from the terminal 32 via the network controlling unit 57.

By counting time based on oscillation signals from the clock oscillator 53*a*, the MPU 53 of the NIC 5 detects a fact that any operation input through the operation/display unit 2 and any data from the terminal 32 through the network 30 have not been received for a given time or longer. According to the detected fact, the MPU 53 of the NIC 5 controls the automatic changeover switches 41 to 45 through the energization switching circuit 10 to change the state of each function block 2, 6 to 9 from "energized state" to "deenergized state" (from operating mode to the sleep mode).

Figure 8:
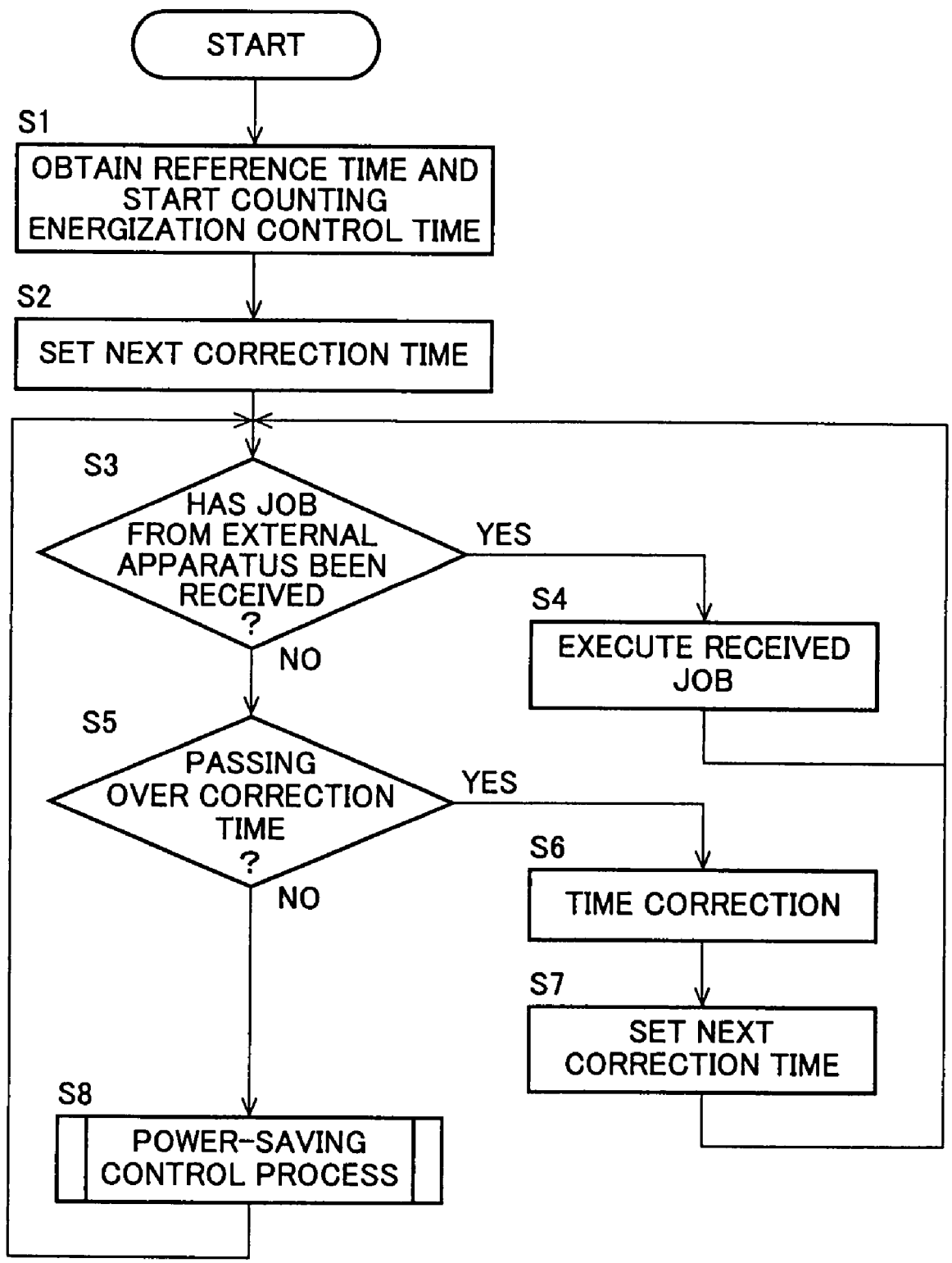
FIG. 8 is a flowchart of a procedure for job execution control in the image processor X.

FIG. 8 is a flowchart of a procedure for job execution control in the image processor X. The procedure for job execution control in the image processor X will be described referring to the flowchart shown in FIG. 8. The process shown in FIG. 8 is executed after energization of every function block of the image processor X has been started. S1, S2, - - - in the flowchart are identification symbols that represent process procedures (steps).

<Step S1, S2>

The MPU 53 of the NIC 5 obtains a reference time from the calendar administrating unit 99 of the main controlling unit 9 to take the obtained reference time to be a time counting start time, and starts counting the present time used for energization control (weekly timer control) on each function block on the basis of clock signals from the clock oscillator 53a (S1). The detail of the time counting process is the same as described before. Hereinafter, a counted time based on clock signals from the clock oscillator 53a is called NIC counted time. Following step S1, the MPU 53 of the NIC 5 continuously counts the NIC counted time. The MPU 53 of the NIC 5, which counts the NIC counted time, and the clock oscillator 53a, which generates clock signals, are an instance of a time counting unit combined by the communication unit.

The MPU 53 of the NIC 5 also sets (store) the next correction time that is determined by adding a given time (e.g., 24 hours) to the time counting start time (S2). This next correction time represents the timing at which the NIC counted time is corrected based on the reference time.

<Step S3 to S7>

The MPU 53 of the NIC 5 then determines on whether a job, such as print process and data filing process, from the external terminal 32 has been received through the network 30 (S3), and on whether the present time (NIC counted time) has passed the correction time (S5).

The data filing process is the process of saving a data file transmitted from the terminal 32 in the HDD 3, changing a place to save the data file in (data folder) or file name, rewriting/deleting data, etc.

When reception of the job is confirmed at step S3, the MPU 53 of the NIC 5 sends the job to the main controlling unit 9, which then controls a needed function block to execute the process corresponding to the job (S4). Afterward, the procedure returns to step S3.

When making a determination at step S5 that the present time (NIC counted time) has been passed the correction time, the MPU 53 of the NIC 5 executes a correction process on the NIC counted time (S6, instance of a time correcting unit). The correction process goes as the process at step S1. According to the process, the MPU 53 of the NIC 5 obtains a reference time (including year/month/day, day of the week, and time) from the calendar administrating unit 99 of the main controlling unit 9, which is in "energized state", to take the obtained reference time to be a time counting start time, and resumes counting of the NIC counted time on the basis of clock signals from the clock oscillator 53a. As a result, the NIC counted time is corrected based on the reference time. Subsequently, MPU 53 of the NIC 5 continuously counts the corrected NIC counted time.

The MPU 53 of the NIC 5 then resets (newly stores) the next correction time that is determined by adding a given time (e.g., 24 hours) to the time counting start time newly set at step S6 (S7). Afterward, the procedure returns to step S3.

When no job reception and time passage over the correction time have been confirmed at steps S3, S5, the image processor X executes a power-saving control process (S8), which will be described later, and then the procedure returns to step s3.

Figure 9:
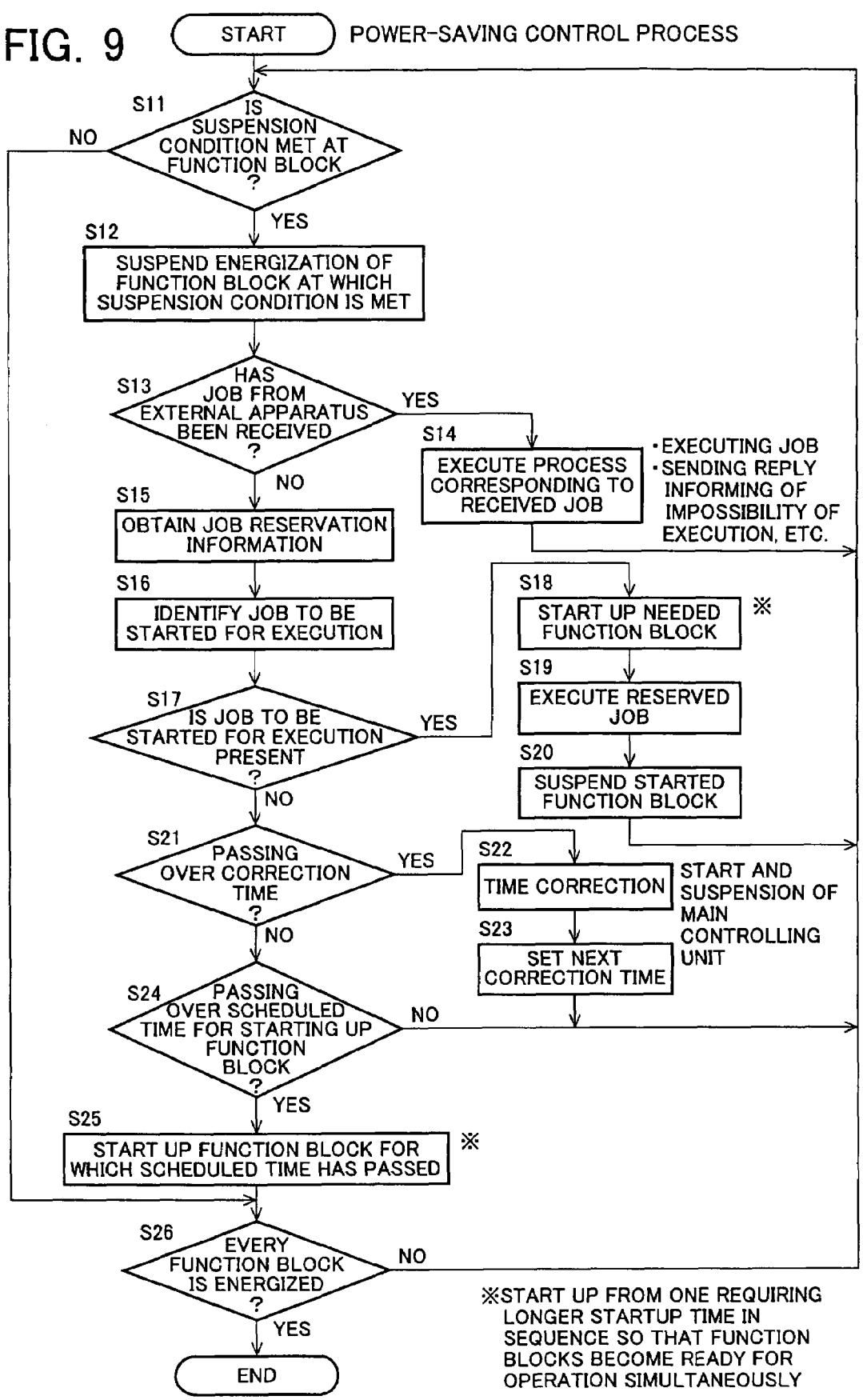
FIG. 9 is a flowchart of a procedure for an energy-saving control process in the image processor X.

FIG. 9 is a flowchart of a procedure for the energy-saving control process in the image processor X. The procedure for the energy-saving control process (steps S11 to S25) executed by the image processor X at step S8 (see FIG. 8) will be described referring to the flowchart shown in FIG. 9.

<Step S11, S12>

In the energy-saving control process, the MPU 53 of the NIC 5 determines first on whether a given suspension condition is met at each function block 2, 6 to 9 (S11).

For each function block 2, 6 to 9, the MPU 53 of the NIC 5 compares the present time (NIC counted time) with the weekly schedule WS, and determines that the suspension condition is met when a condition of bringing each function block into "deenergized state" (the first sleep condition) is met. Specifically, the MPU 53 determines on whether the present time falls onto a blank square time zone in the weekly schedule WS shown in FIG. 7. The MPU 53 of the NIC 5 also gives a determination that the suspension condition is met when the second sleep condition is met.

When determining that the suspension condition based on the weekly schedule WS is not met at any function block, the MPU 53 of the NIC 5 puts the procedure forward to step S26, which will be described later, and to the next step S12 when determining otherwise.

At step S12, the MPU 53 of the NIC 5 controls the energization switching circuit 10 to suspend energization to a function block at which the suspension condition is met at step S8 (change from "energized state" to "deenergized state").

<Step S13, S14>

The MPU 53 of the NIC 5 then determines on whether a job, such as print job (job requesting a print process) and data filing job (job requesting for a data filing process), from an external terminal 32 has been received through the network 30 (S13).

Upon determining that the job has been received, the MPU 53 of the NIC 5 puts the procedure forward to the next step S14, and to step S15, which will be described later, when determining otherwise.

At step S14, the MPU 53 of the NIC 5 causes a function block to execute the process corresponding to the job received at step S13, and then puts the procedure back to aforementioned step S11.

At step S14, the MPU 53 of the NIC 5 determines first on whether the received job can be executed by a function block that is in "energized state" at this point. When determining that the job can be executed by the function block, the MPU 53 of the NIC 5 sends the job to the main controlling unit 9, which then controls a needed function block to execute the job.

When determining that the received job cannot be executed by the function block that is in "energized state" at this point, the MPU 53 of the NIC 5 informs the terminal 32, which requests the process, in reply that the requested process cannot be executed due to suspension of function blocks.

This prevents a user of the terminal 32 from having a wrong idea that the image processor X is developing a trouble.

At this point, however, when the image processor X is in the sleep mode that has resulted from meeting of the second sleep condition, the MPU 53 of the NIC 5 starts up a function block on suspension (function block needed for execution of the job) to cause the function block to execute the received job.

Upon starting the function block, the MPU 53 of the NIC 5 identifies a subpower supply 22 that must be turned on for execution of the received job on the basis of the job type/subpower link table D12 (see FIG. 4), which is stored beforehand in the flash memory 56, etc.

<Step S15, S16>

At step S15, the MPU 53 of the NIC 5 reads out job reservation information D11 (see FIG. 3) stored in the flash memory 56 to obtain the scheduled time d3, the reserved job ID (d1) identifying a reserved job to be executed at the scheduled time d3, and the type d2 of the reserved job (each of the time d3, job ID d1, and type d2 is an instance of reserved job information) (S15, an instance of a reserved information obtaining unit).

The job reservation information D11 may be stored in a memory unit of such an external apparatus as computer with which the NIC can communicate through the network 30. In this case, the MPU 53 of the NIC 5 obtains the job reservation information D11 from the memory unit of the external apparatus through network 30.

The MPU 53 of the NIC 5 identifies a reserved job to be started for execution (i.e., identifies the reserved job ID (d1)) on the basis of the NIC counted time based on oscillation signals from the clock oscillator 53a (an instance of a counted time given by the time counting unit) and of the scheduled time d3 obtained at step S15 (S16, an instance of an execution start job identifying unit).

At step S16, the MPU 53 of the NIC 5 determines first on whether the NIC counted time has reached one or more scheduled times d3. The MPU 53 does not identify the job to be started for execution when the NIC counted time has not reached any scheduled times d3, which means that the job to be started for execution is not present.

When determining that the NIC counted time has reached one or more scheduled times d3, the MPU 53 of the NIC 5 identifies the reserved jobs (reserved job ID (d1)) corresponding to all scheduled times d3 included in a preset permissible time range as reserved jobs to be started for execution for the NIC counted time. In this manner, when a plurality of scheduled times d3 included in the permissible time range are present for the NIC counted time, a plurality of reserved jobs corresponding to the plurality of scheduled times d3 are identified as the reserved jobs to be started for execution.

<Step S17, S18>

The MPU 53 of the NIC 5 then determines on whether a job to be started for execution is present (whether a reserved job to be started for execution has been identified at step S16) (S17). When the job is present, the MPU 53 puts the procedure forward to the next step S18, and to step S21, which will be described later, when the job is not present.

At step S18, when suspended (in "deenergized state") function blocks are present, the MPU 53 of the NIC 5 starts up a function block needed for execution of the job to be started for execution, which is identified at step S16, out of the suspended function blocks (S18, an instance of an automatic start controlling unit). This start of the function block, that is, change from "deenergized state" to "energized state" of the function block, is carried out through control over the energization switching circuit 10 by the MPU 53 of the NIC 5.

Upon starting the function block, the MPU 53 of the NIC 5 identifies a subpower supply 22 that must be turned on for execution of the reserved job on the basis of the job type/subpower link table D12 (see FIG. 4), which is stored beforehand in the flash memory 56, etc. As described before, the job type/subpower link table D12 is the information that indicates the linked relation between the type of jobs and the subpower supplies 22 supplying power to function blocks needed for execution of the jobs.

At step S18, when a plurality of function blocks are started up, the MPU 53 of the NIC 5 separately starts up each of the plurality of function blocks to be started (brings the function blocks into "energized state") in sequence from a function block requiring a longer startup time according to a predetermined procedure so that the function blocks become completely ready for operation (ready state) almost simultaneously.

Figure 10:
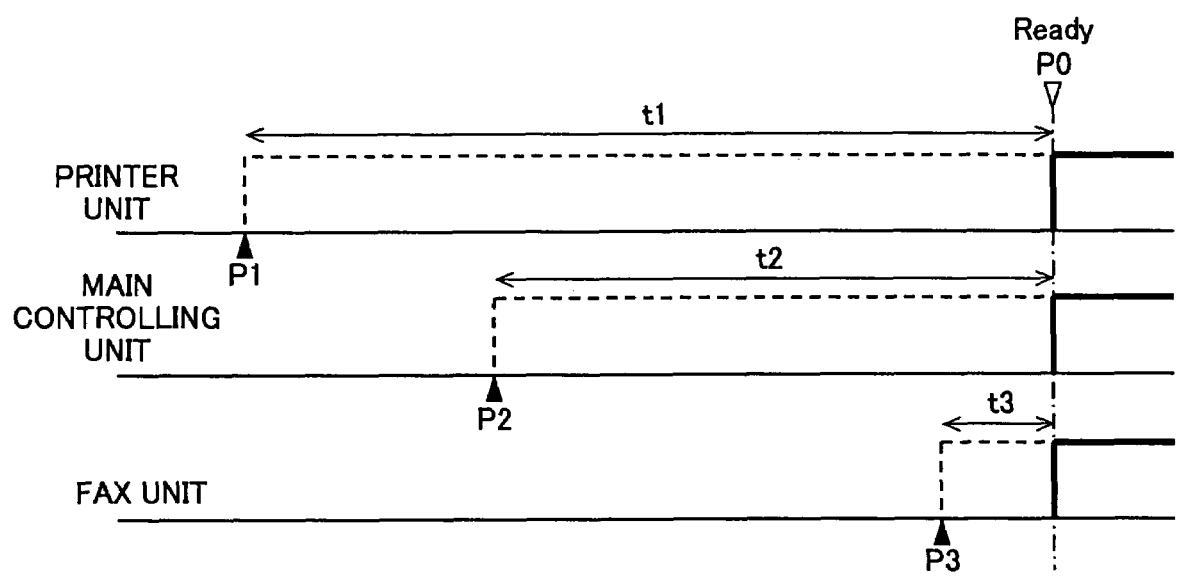
FIG. 10 is a time chart of an example of a start procedure for a plurality of function blocks in the image processor X.

FIG. 10 is a time chart of an example of a start procedure for a plurality of function blocks in the process at step S18.

The example shown in FIG. 10 is the example of the procedure for staring up the printer unit 7 (including a fixing heater), the main controlling unit 9, and the fax unit 8.

In FIG. 10, the startup time of each function block (time taken to reach the state of being completely ready for operation from the start of energization) is: t1 for the printer unit 7, t2 (<t1) for the main controlling unit 9, and t3 (<t2) for the fax unit 8. The approximate values for the startup times t1 to t3 can be known in advance for each type of the image processor.

In the case of the example shown in FIG. 10, the MPU 53 of the NIC 5 first starts energization of the printer unit 7, whose startup time t1 is the longest, at a point P1 at which the process at step S18 starts, then starts energization of the main controlling unit 9, whose startup time t2 is the second longest one, at the point P2 at which the time (t1-t2) has passed from the point P1. Subsequently, the MPU 53 starts energization of the fax unit 8, whose startup time is the next in length to that of the main controlling unit 9, at the point P3 at which the time (t2-t3) has passed from the point P2. In this manner, the MPU 53 sequentially starts up needed function blocks (suspended function blocks) in the order of length of the startup time while shifting startup points by startup time differences of (t1-t2) and (t2-t3). As a result, every function block becomes completely ready for operation at the same point P0 almost simultaneously. By starting up a plurality of function blocks according to such a procedure, wasted power is reduced in a waiting time from a point at which a function block with a shorter startup time becomes completely ready for operation to a point at which other function blocks becomes completely ready for operation.

To achieve the above startup process, for example, the startup time of each function block is stored in the flash memory 56 of the NIC 5, and the MPU 53 of the NIC 5 controls the startup start points of the function blocks according to the differences between the startup times.

<Step S19, S20>

The MPU 53 of the NIC 5 then delivers the reserved job Id (d1) identified at step S16 to the main controlling unit 9 to cause function blocks including the main controlling unit 9 to execute the reserved job corresponding to the reserved job Id (d1) (S19). At step S19, the information linked to the executed reserved job out of the job reservation information D11 stored in the flash memory 56 of the NIC 5 and in the HDD 3 is marked with a flag indicating deletion or execution of the job, and is excluded from the subject of execution from that time onward.

The main controlling unit 9 obtains the reserved job Id (d1) representing the reserved job to be started for execution from the NIC 5, and executes the reserved job (the reserved job stored in the HDD 3) corresponding to the reserved job Id (d1) through control over the function block corresponding to the job. The detail of the linked relation between the type of jobs and function blocks is the same as the foregoing description of the job type/subpower supply link table D12.

When processing of the reserved job identified at step S16 is over, the MPU 53 of the NIC 5 controls the energization switching circuit 10 and stops energizing the function block started at step S18 to return the energization state of each function block to the original state (state before execution of the reserved job) (S20), and then puts the procedure back to aforementioned step S11.

<Step S21 to S23>

When the MPU 53 of the NIC 5 determines that the reserved job to be started for execution has not been identified (is not present) at step S17, the MPU 53 determines on whether the present time (NIC counted time) has passed the correction time (S21).

When the present time (NIC counted time) has passed the correction time, the MPU 53 of the NIC 5 executes the correction process on the NIC counted time as the process at step S6 (S22, an instance of a time correcting unit). At step S22, when the main controlling unit 9 is suspended (in "deenergized state"), the MPU 53 of the NIC 5 controls the energization switching circuit 10 to start up the main controlling unit 9, and obtains a counted time given by the calendar administrating unit 99 incorporated in the main controlling unit 9, and then executes the correction process on the NIC counted time. When the time correction is over, the MPU 53 stops energization to the main controlling unit 9 again.

The above process prevents a long period of an uncorrected state of a counted time based on the clock oscillator 53a, and also prevents inaccuracy in execution of a reserved job and/or weekly timer control.

The MPU 53 of the NIC 5 then resets (newly stores) the next correction time that is determined by adding a given time (e.g., 24 hours) to a time counting start time newly set at step 22 (S23). Afterward, the procedure returns to aforementioned step S11.

<Step S24, S25>

When the passage over the correction time by the present time is not confirmed at step S21, the MPU 53 of the NIC 5 compares the present time (NIC counted time) with the weekly schedule WS to determine for each of function blocks suspended at this point on whether the present time has passed a time for starting up a suspended function block (startup schedule time) (S24). In other words, the MPU 53 determines for each suspended function block on whether the startup condition for a change into "energized state" is met. Specifically, the MPU 53 determines on whether the present time falls onto a time zone marked with "*" in the weekly schedule WS shown in FIG. 7.

When no function block having passed the startup schedule time is included in the suspended function blocks, the MPU 53 of the NIC 5 puts the procedure back to aforementioned step S11.

When a function block having passed the startup schedule time is included in the suspended function blocks, the MPU 53 of the NIC 5 controls the energization switching circuit 10 to start up the function block (S25).

In this manner, when one or more function blocks are in "deenergized state", the MPU 53 of the NIC 5 changes the state of the function blocks into "energized state" according to the weekly schedule WS (an instance of a time schedule) stored in the flash memory 56.

At step S25, as at step S18, when a plurality of function blocks are started up, the MPU 53 of the NIC 5 separately starts up each of the plurality of function blocks to be started (brings the function blocks into "energized state") in sequence from a function block requiring a longer startup time according to a predetermined procedure so that the function blocks become completely ready for operation (ready state) almost simultaneously.

<Step S26>

After the start of the function block by the process at step S25, or when it is determined by the process at step S11 that the suspension condition for switching each function block into "deenergized state" is not met, the MPU 53 of the NIC 5 determines on whether every function block is in "energized state" (S26).

At this point, when the MPU 53 of the NIC 5 determines that every function block is in "energized state" (state of the operating mode), the MPU 53 ends the power-saving control process. Following this, the aforementioned steps S3 to S7 (see FIG. 8), which are the processes executed when every function block is in "energized state", are repeated.

When determining that one or more function blocks are in "deenergized state", on the other hand, the MPU 53 of the NIC 5 puts the procedure back to aforementioned step S11, which is followed by repetition of steps S11 to S25, which are the processes executed when one or more of function blocks are in "deenergized state".

As described above, the image processor X is capable of energization control over the function blocks 2, 6 to 9 needed for execution of a job, independent of energization of the NIC 5. The image processor X can, therefore, keep the processor X capable of executing the communication process (S14) with such an external apparatus as the terminal 32 even in the energy-saving state, where each function block 2, 6 to 9 is not energized. In addition, according to the image processor X, the NIC 5, which is kept energized even when the image processor is in the energy-saving state, offers a function of time management (S15 to S17) for the job reservation function, and of controlling the startup of a function block needed for execution of a reserved job (S18). Because of this, the image processor X can realize the job reservation function while reducing power consumption as much as possible in the energy-saving state.

The above embodiments present a case where the image processor X stores reserved jobs (actual contents of the reserved jobs) beforehand in the HDD 3.

However, at aforementioned step S19, the main controlling unit 9 may obtain a reserved job from the external terminal 32 or another external apparatus through the NIC 5 and the network 30.

Besides, the MPU 53 of the NIC 5 may also carry out one or plurality of processes (hereinafter job reservation information external access process) on the job reservation information D11 stored in the flash memory 56 (an instance of a job reservation information memory unit) of the NIC 5, the processes being executed out of processes of transmission to an external apparatus, contents updating, and information deletion, in response to a request from the external apparatus through the network 30.

This eliminates a need of bothering to start up the main controlling unit 9 of the image processor X for reference to or updating of the job reservation information D11 when the main controlling unit 9 is in "deenergized state", thus enables suppression of an increase in power consumption.

In this case, the MPU 53 of the NIC 5 executes the job reservation information external access process in response to a request from an external apparatus at step S14 shown in FIG. 9. When information updating or deletion is carried out on the job reservation information D11 in the above process, however, the MPU 93 of the main controlling unit 9 updates the job reservation information D11 stored in the HDD 3 to make the job reservation information D11 identical with that stored in the flash memory 56 of the NIC 5 before the procedure proceeds from step S18 to step S19 as shown in FIG. 9.

The image processor according to the present invention is capable of energization control over a function block needed for execution of a job, independent of energization of the communication unit. As a result, the image processor can keep the processor capable of executing a communication process with an external apparatus even in the energy-saving state, where function blocks are not energized. In addition, according to the image processor, the communication unit, which is kept energized even when the image processor is in the energy-saving state, offers the function of time management for the job reservation function, and of controlling the startup of a function block needed for execution of a reserved job. Because of this, the image processor can realize the job reservation function while reducing power consumption as much as possible in the energy-saving state.

The automatic startup controlling unit separately changes the energization state of each of a plurality of function blocks. This allows the startup (changing into the energized state) of the minimum number of function blocks necessary at required timing. As a result, further energy-saving becomes possible.

Particularly, the automatic startup controlling unit separately starts up each of the plurality of function blocks in sequence from a function block requiring a longer startup time (time taken to reach the state of being completely ready for operation from the start of energization) according to a predetermined procedure so that the plurality of function blocks become completely ready for operation almost simultaneously. This enables a reduction in wasted power that results when a function block requiring a shorter startup time starts first.

The time counting unit combined by the communication unit counts time based on a result of summation of clock signals generated by the clock signal generating unit, and correction of the counted time is carried out when a function block having the reference time counting unit is in the energized state. This eliminates a need of providing the communication unit anew with such a high-performance component as clock IC. As a result, an increase in power consumption by the communication unit and in costs can be avoided.

The invention claimed is:

1. An image processor having a communication unit that communicates with an external apparatus, the image processor comprising:
   an energization switching unit that makes switchover in separately energizing/deenergizing each of a plurality of function blocks, each functional block being a component or an assembly of components executing a given job, independent of energization of the communication unit;
   the communication unit including:
      a time counting unit that counts a present time;
      a job reservation information obtaining unit that obtains a given scheduled time and reserved job information on a reserved job to be executed at the scheduled time from a given memory unit;
      an execution start job identifying unit that identifies the reserved job to be started for execution on the basis of a counted time given by the time counting unit and of the scheduled time obtained by the reservation information obtaining unit; and
      an automatic startup controlling unit that changes a state of a function block needed for execution of the reserved job into an energized state, the reserved job being identified by the execution start job identifying unit, through control over the energization switching unit when the function block is in a deenergized state, wherein the communication unit is a network interface card.

2. The image processor of claim 1, further comprising a job reservation information memory unit that stores job reservation information that links the scheduled time to the reserved job information, wherein
   the reservation information obtaining unit obtains the scheduled time and the reserved job information from the job reservation information memory unit.

3. The image processor of claim 1, wherein
   the communication unit combines includes a job reservation information external access unit that executes one or plurality of processes at least one process on the job reservation information stored in the job reservation information memory unit, wherein the at least one process includes transmitting to an external apparatus, updating content, and deleting information the processes being executed out of processes of transmission to an external apparatus, contents updating, and information deletion, in response to a request from the external apparatus.

4. The image processor of claim 1, wherein
   when a plurality of the scheduled times included in a given time range are present for a counted time given by the time counting unit, the execution start job identifying unit identifies a plurality of the reserved jobs corresponding to the plurality of the scheduled times as reserved jobs to be started for execution.

5. The image processor of claim 1, wherein
   when a state of a plurality of function blocks is changed into an energized state, the automatic startup controlling unit changes the state of the function blocks into the energized state in sequence from a function block requiring a longer startup time according to a predetermined procedure.

6. The image processor of claim 1 wherein
   when a state of a plurality of function blocks is changed into an energized state, the automatic startup controlling unit changes the state of the function blocks into the energized state such that the function blocks becomes completely are ready for operation almost simultaneously.

7. The image processor of claim 1, wherein
   the function block has a reference time counting unit that counts a reference time for the image processor while being supplied with backup power from a battery, and wherein
   the time counting unit combined by the communication unit includes:
   a clock signal generating unit that generates clock signals at a constant cycle;
   a clock summation time counting unit that counts a present time on the basis of a result of summation of the clock signals; and
   a time correcting unit that obtains a counted time given by the reference time counting unit to correct a counted time given by the clock summation time counting unit when the function block having the reference time counting unit is in an energized state.

8. The image processor of claim 7, wherein
   when the function block having the reference time counting unit is in a deenergized state, the time correcting unit changes the state of the function block into an energized state through control over the energization switching unit and obtains a counted time given by the reference time counting unit incorporated into the function block to correct a counted time given by the clock summation time counting unit.

9. The image processor of claim 2, wherein
the communication unit includes a job reservation information external access unit that executes at least one process on the job reservation information stored in the job reservation information memory unit, wherein the at least one process includes transmitting to an external apparatus, updating content, and deleting information in response to a request from the external apparatus.

10. The image processor of claim 2, wherein
when a plurality of the scheduled times included in a given time range are present for a counted time given by the time counting unit, the execution start job identifying unit identifies a plurality of the reserved jobs corresponding to the plurality of the scheduled times as reserved jobs to be started for execution.

11. The image processor of claim 2, wherein
when a state of a plurality of function blocks is changed into an energized state, the automatic startup controlling unit changes the state of the function blocks into the energized state in sequence from a function block requiring a longer startup time according to a predetermined procedure.

12. The image processor of claim 2, wherein
the function block has a reference time counting unit that counts a reference time for the image processor while being supplied with backup power from a battery, and wherein
the time counting unit combined by the communication unit includes:
a clock signal generating unit that generates clock signals at a constant cycle;
a clock summation time counting unit that counts a present time on the basis of a result of summation of the clock signals; and
a time correcting unit that obtains a counted time given by the reference time counting unit to correct a counted time given by the clock summation time counting unit when the function block having the reference time counting unit is in an energized state.

* * * * *